Patented May 4, 1926.

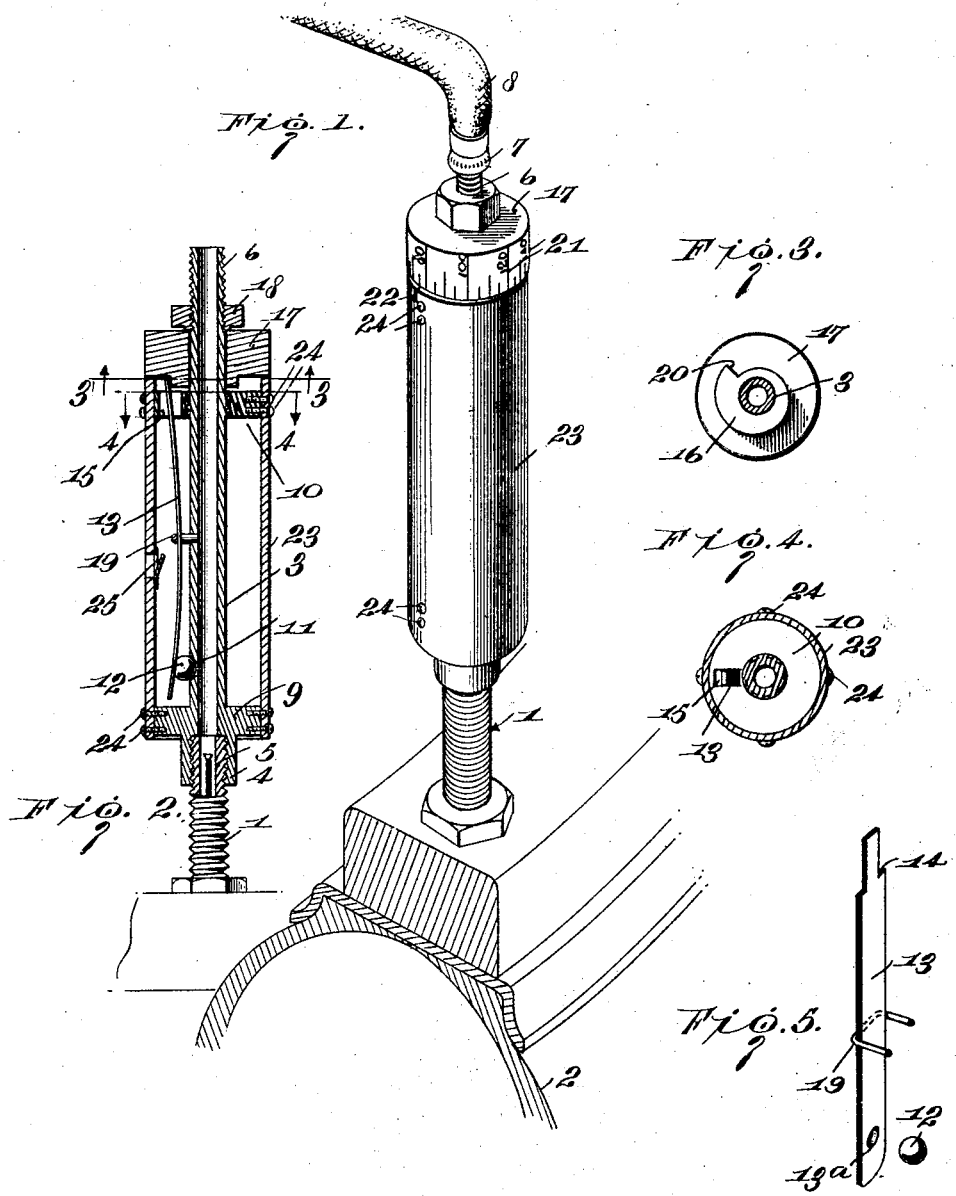

1,582,928

UNITED STATES PATENT OFFICE.

DANIEL HARMON HOAG, OF NEMADJI, MINNESOTA.

AIR-RELEASING DEVICE.

Application filed March 5, 1924. Serial No. 697,094.

*To all whom it may concern:*

Be it known that I, DANIEL HARMON HOAG, a citizen of the United States, residing at Nemadji, in the county of Carlton and State of Minnesota, have invented certain new and useful Improvements in Air-Releasing Devices, of which the following is a specification.

My invention relates generally to improvements in air releasing devices, more particularly to improvements in air releasing devices of the type adapted to be attached to the valve stem of a pneumatic tire to give warning when the pressure in the tire reaches a predetermined pressure and to permit the escape of the surplus pressure fluid from the tire pump or other source after the pressure therewithin equals the predetermined pressure, and it consists in the combinations, constructions and arrangements herein described and claimed.

An object of the invention is to provide a simple and reliable device of the character described which can be set quickly and easily without the use of any tools to permit the escape of pressure fluid and to give audible warning when the pressure within the tire reaches a predetermined pressure which can be varied within a considerable range.

A further object of the invention is to provide a device of the character described which will require no adjustment or attention after the device has been set at a predetermined pressure to permit the escape of pressure fluid and to give warning when the presure within a pneumatic body to which the device is attached reaches the predetermined pressure.

A still further object of the invention is to provide a device of the character described which is constructed in such manner that the pressure at which the device is set at a given time may be ascertained at a glance.

A still further object of the invention is to provide a safe and reliable means whereby a tire may be inflated in the dark as accurately and safely as in the light.

Other objects and advantages of the invention will be apparent from the following description, considered in conjunction with the accompanying drawings, in which;

Figure 1 is a perspective view showing the releasing device in use,

Figure 2 is a longitudinal central section through the device, showing also the manner of attaching the latter to the valve stem of a pneumatic tire, Figure 3 is a section along the line 3—3 of Figure 2, Figure 4 is a section along the line 4—4 of Figure 2, and Figure 5 is a perspective view showing a ball valve, a ball valve retaining spring member and a fulcruming means for the valve retaining member.

Referring now to the drawings and particularly to Figures 1 and 2, the numeral 1 designates the usual externally threaded stem of a pneumatic tire 2. In carrying out the invention, I provide a tubular body 3 provided with an enlarged end portion 4 having an internally threaded counterbore 5 adapted for threaded engagement with the outer end portion of the tire valve stem 1.

The other end portion of the tubular body is provided with external screw threads, as at 6 and is thus adapted for engagement with the usual connection 7 at the outer end of the discharge tube or outlet 8 of the usual pump (not shown) or like device for forcing air into the tube 2.

The tubular body 3 is formed with an annular flange or enlargement 9 at the inner end of the enlarged end portion 4 and with a similar removable annular flange or collar 10 at an appreciable distance from the outer end of the tubular body. The tubular body 3 is provided with a lateral port 11 relatively adjacent to the flange 9 and in the portion of the tubular body that extends between the flanges 9 and 10. The port 11 is enlarged at its outer end to provide a seat for a ball valve 12. The ball valve normally is held against its seat and in position to prevent escape of pressure fluid through the port 11 from the bore of the tubular body by a valve retaining member or lever 13. The latter consists of an elongated and preferably flat spring member having one end portion thereof provided with an opening 13ª partially receiving the ball valve 12, the center of opening 13ª being diametrically opposite the axial line of the port 11, the member 13 extending alongside the tubular body and being reduced in width adjacent to its other end, as at 14, so that the reduced end portion thereof may extend through a radial aperture 15 in the flange and rest adjacent to its outer end against the outer surface of a cam 16 that forms an axial extension to an indicator wheel or disk 17. The latter is mounted on the tubular body outwardly of the flange 10 with the cam extension 16 in adjacent spaced relation to the flange 10 and may be clamped against a cylindrical shell 23 by a jam nut 18 that is in threaded engagement with the outer end portion of the tubular body. The spring member 13 is bowed slightly inward intermediate its length because of its engagement with the bent portion of a substantially U-shaped clip 19 through which the member 13 extends and which has the arms thereof fixed in the tubular body 3, whereby the end portions of the spring member will be continuously under tension and respectively will exert pressures on the ball valve 11 and the outer surface of the cam 16 tending to move these elements bodily substantially at right angles to the longitudinal axis of the tubular body and transversely across the latter. Obviously the pressure of the one end portion of the spring member on the ball valve 12 tends to hold the latter against its seat. It also will be manifest that the clip 19 serves as a fulcrum for the spring member 13 and that the pressure exerted by one end portion of the spring member tending to prevent outward movement of the ball valve from its seat will vary directly with the pressure tending to force the other end portion of the spring member outward or away from the tubular body 3. The pressure on the ball valve therefore may be varied by rotating the wheel 17 and the cam extension 16 thereto to increase or decrease the radial distance from the axis of the tubular body at which second named end portion of the spring member 13 will be held, the outer surface of the cam extension describing an evolute curve as clearly shown in Figure 3 and increasing regularly in radial distance from the axes of the tubular body from the inner end of a radial shoulder 20 that is formed on the cam extension to the outer end of the radial shoulder.

The indicator wheel 17 is provided with a circumferentially extending series of graduations on its periphery, as at 21, the graduations representing units of a scale for indicating pounds of pressure and certain of the graduations being appropriately marked in view of the curvature of the outer surface of the cam 16 and with respect to an index element 22 on the cylindrical shell 23 which is supported on the flanges 9—10 in spanning relation to the latter so that the graduation 21 in register with the index element 22 at any given time will indicate the pounds pressure at which the end portion of the spring member 13 holding the ball valve 12 against its seat will yield to an extent sufficient to permit escape of air through the port 11. The cylindrical shell 23 is secured to the flanges 9—10 by screws 24 or like fastening devices and has a substantially fluid tight fit with the peripheral walls of the flanges 9—10. The shell 23 is provided with a whistle orifice 25 through which air escaping from the bore of the tubular body through the port 11 will rush with a whistling sound.

From the foregoing description of the various parts of the device the operation thereof may be readily understood. The device is designed primarily for use for application to the tire valve stem of a deflated pneumatic tire when it is desired to inflate the tire to a certain pressure and to receive notice when that pressure has been reached. The nut 18 is loosened and the wheel 17 and cam extension thereto are rotated until the graduation representing the pressure to which it is desired to inflate the tire is in register with the index element 22. The nut 18 then is tightened to hold the wheel 17 and cam extension thereto in adjusted position. The outer end portion of the tubular body having been attached to the service connection of a pump, air is forced from the latter through the tubular body into the tire valve stem in an ordinary manner, the flow of pressure fluid into the tire valve stem continuing until the pressure therewithin reaches the pressure at which the end portion of the spring member 13 holding the ball valve 12 against its seat will yield. Pressure fluid escaping through the port 11 past the valve 12 will rush through the whistle orifice 25 and cause the sounding of a signal that will apprise the operator that the tire has been inflated to a desired pressure.

The means for giving the audible signal when air escapes through the port 11 may vary considerably from that illustrated in the drawings and described in the foregoing without departing from the spirit and scope of the invention. Also, it is obvious that many modifications and adaptations of the form of the device disclosed herein may be provided without departing from the spirit and scope of the invention and I therefore consider as my own all such modifications and adaptations as fairly fall within the scope of the appended claims.

I claim:

1. A device of the character described comprising a tubular body attachable at one end to a source of pressure and at its opposite end to the inlet of a pneumatic body, said tubular body having a lateral port, said lateral port being enlarged at its outer end, a ball valve adapted to engage with the enlarged end portion of said port and to then close the latter, a spring lever fulcrumed on said tubular body intermediate its length and having one end portion thereof pressed against said ball valve and tending to hold the ball valve in closed position, and a rotatable cam carried by said tubular body in engagement with the other end portion of the spring lever for adjusting the tension on the latter.

2. A device of the character described comprising a tubular body attachable at one end to a source of pressure and at its opposite end to the inlet of a pneumatic body, said tubular body having a lateral port, said lateral port being enlarged at its outer end, a ball valve adapted to engage with the enlarged end portion of said port and to then close the latter, a spring lever fulcrumed on said tubular body intermediate its length and having one end portion thereof pressed against said ball valve and tending to hold the ball valve in closed position, a rotatable cam carried by said tubular body in engagement with the other end portion of the spring lever for adjusting the tension on the latter, and indicator means associated with said cam for indicating the pressure at which ball valve will be permittted to move from closed position at any given time.

DANIEL HARMON HOAG.